United States Patent Office 3,221,871
Patented Dec. 7, 1965

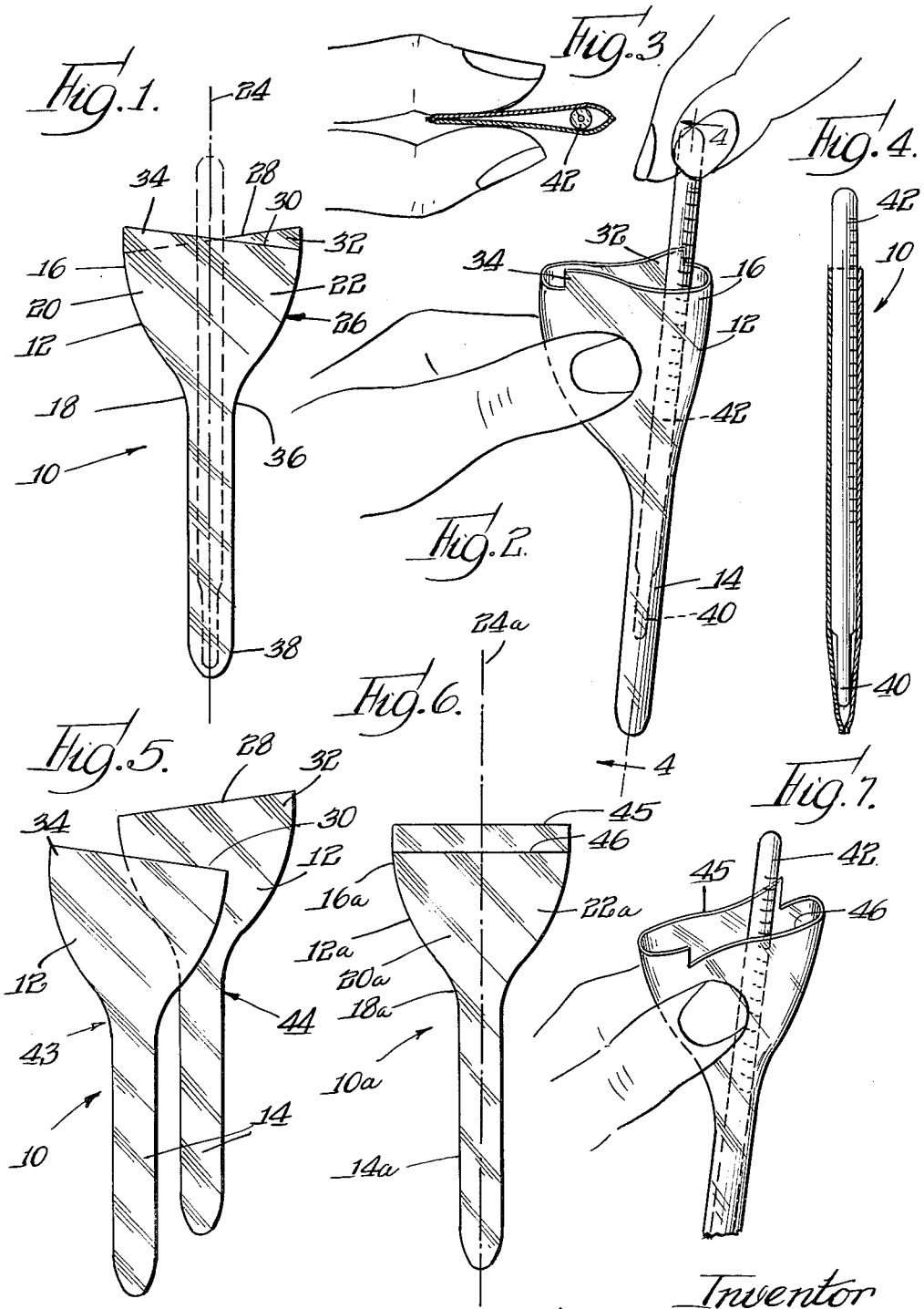

3,221,871
DISPOSABLE THERMOMETER SHEATH
Walter E. Hidding, 505 Banbury Road, Addison, Ill.
Filed Dec. 3, 1964, Ser. No. 415,631
3 Claims. (Cl. 206—16.5)

This invention relates to a disposable plastic sheath for a clinical thermometer.

In the past, various disposable plastic sheaths have been proposed to prevent a reused thermometer from transferring germs from one patient to another. Problems have been created in the use of the prior art sheaths in that left handed persons have had difficulty in using them. The particular difficulty has resided in grasping the sheath and opening it for insertion of the thermometer.

Accordingly, it is a broad object of the present invention to provide a new and improved disposable protective plastic sheath for a clinical thermometer.

It is another object of the invention to provide a disposable thermometer sheath having a novel mouth portion which opens quickly and easily for receipt of a thermometer.

It is a further object of the invention to provide a thermometer sheath having grippable portions suitable for use by either left or right handed persons in manipulating the sheath to receive a thermometer.

Still another object of the invention is to provide a disposable thermometer sheath having a projecting lip to catch the leading edge of a thermometer and help guide it into the mouth of the sheath.

These and other objects and advantages of the invention will appear from the following description taken in conjunction with the appended claims and drawings, wherein:

FIG. 1 is a side elevational view of an embodiment of the invention with a clinical thermometer shown inserted therein;

FIG. 2 is a perspective view of the embodiment of FIG. 1 showing the manner in which the embodiment may be gripped and the manner in which a thermometer may be inserted therein;

FIG. 3 is a top plan view of the embodiment of FIGS. 1 and 2;

FIG. 4 is a sectional view along the lines 4—4 of FIG. 2 with a thermometer fully inserted;

FIG. 5 is an exploded side elevational view of the embodiment of FIG. 1;

FIG. 6 is a side elevational view of another embodiment of the invention;

FIG. 7 is a perspective view of the embodiment illustrated in FIG. 6 showing the manner in which the embodiment may be gripped.

Referring now in detail to the drawings and specifically to FIG. 1, a thermometer sheath designated generally by the numeral 10 will be seen to include a mouth portion 12 and a narrow elongated boot or finger portion 14.

The mouth portion 12 is of generally inverted bell shape having an open upper end 16 for admitting a thermometer and a root end 18 for connection to the boot portion. The mouth portion has left and right gripping portions 20 and 22 on either side of the longitudinal axis 24 of the sheath for use in gripping and opening the sheath with one hand for receipt of a clinical thermometer. The bell shaped mouth portion is seen to be widest at its upper open end and to have a tapering portion designated generally by the numeral 26 converging the mouth portion gradually to the relatively narrow root end 18.

The open end of the mouth portion has first and second upper edges 28 and 30, best seen in FIGS. 1 and 5, which are oppositely biased, that is, the upper edges are diagonally offset to provide first and second projecting lips 32 and 34.

The upper edge 28 is cut diagonally on a bias downwardly from right to left as viewed in FIG. 1; and the upper edge 30 is cut diagonally on a bias downwardly from left to right. This arrangement of the upper edges 28 and 30 is also shown in FIG. 5, FIG. 5 additionally illustrating one way in which the sheath may be formed from two separate panels, the panels being joined together at their edges in constructing the sheath.

The projecting lips 32 and 34 provide a back stop or upwardly projecting ledge or lip to catch the leading tip of the thermometer for use in helping guide the thermometer into the open mouth of the sheath.

The bell shaped mouth portion of the sheath is substantially symmetrical, that is, the left and right holding portions of the mouth are symmetrically disposed relative to the longitudinal axis 24 of the sheath for a major portion of the length of the mouth portion from the root end toward the open upper end.

The boot portion 14 of the sheath is a relatively narrow elongated portion adapted to fit snugly about a thermometer and comprises the portion of the sheath to be inserted into a person's mouth. The boot has a longitudinal axis which is aligned with the axis 24 of the sheath and has an open upper end 36 connected to the root end of the mouth portion and a closed opposite end 38 for use in isolating the thermometer from its environment.

The manner in which the sheath is used is best seen in FIGS. 2 and 3 which show one of the gripping portions of the sheath being gripped between the thumb and forefinger of the left hand of a person. FIG. 2 illustrates a right handed person gripping the sheath on the left side, opening the sheath by a slight rubbing movement, that is, slipping the thumb forwardly with respect to the forefinger with the frictional contact of the fingers on the plastic sheath being sufficient to open the sheath for insertion of the thermometer. With the sheath opened as illustrated in FIG. 2, the projecting upper lip portion 32 forms a backstop to catch a leading tip or end 40 of a thermometer 42 to help guide the thermometer into the open mouth of the sheath.

It will be apparent from the drawings that the sheath would be operable or opened and gripped in exactly the same manner when used by either a left or a right handed person. In the case of a left handed person, the sheath would be gripped on the right side between the thumb and forefinger of the right hand with the projecting lip 34 forming a backstop to catch the leading tip of the thermometer.

As illustrated in FIG. 5, the sheath may be formed of a first panel 43 and a second panel 44 fabricated from a polyolefin, such as polyethylene, or other similar flexible, slippery plastic materials; and the edges of the two panels are advantageously joined together as by conventional heat sealing to form the sheath 10. Alternately, the sheath may be formed in one piece, by blow molding for example. The bell shaped mouth portion of the sheath is substantially symmetrical about the longitudinal axis of the sheath for a major portion of the length from the root end to the open upper end.

The plastic of which the sheath is formed is characterized by having a high degree of slip so as to permit the sheath inner surfaces to move freely with respect to one another. Thus, when gripped between the thumb and forefinger of a person's hand, the respective panels 43 and 44 are readily moved past each other to open the sheath.

While one particular embodiment of the invention has been shown and described thus far, it should be recognized that many modifications may be made. Therefore, and in order to enhance the understanding of the invention, a modified embodiment of the invention is shown in FIGS. 6 and 7 wherein like numerals have been used to designate parts which are similar to those parts found in the embodiment of FIGS. 1–5. The suffix letter *a* distinguishes those elements associated with the embodiment FIGS. 6 and 7.

The embodiment illustrated in FIGS. 6 and 7 is distinguished by the provision of upper edges 45 and 46 which are generally parallel to each other, but spaced longitudinally of the axis of the sheath. The edges 45 and 46 are also disposed generally transverse to the longitudinal axis of a sheath.

The upper edge 45 extends laterally across a diameter of the mouth of the sheath and projects upwardly from the edge 46 by a fraction of an inch to form a projecting lip providing a backstop to catch the leading tip of a thermometer and to help guide it into the opening provided in the mouth of the sheath.

The manner of use of the embodiment of FIG. 6 is best seen in FIG. 7 which shows the sheath being grasped at its holding portion 20*a* between the thumb and forefinger of a person's left hand. By rubbing the fingers relative to each other, the mouth of the sheath is opened with the upwardly projecting lip defined by the upper edge 45 acting as a backstop to catch the leading tip of the thermometer and to help guide it into the sheath. When the sheath 10*a* is used by a left handed person, it is grasped in a similar manner about the right hand gripping portion 22*a* between the thumb and finger of the right hand.

After insertion of the sheathed thermometer into a patient's mouth, the sheath and thermometer are removed as a unit from the patient's mouth by gripping the dry, exposed portion of the sheath between the thumb and forefinger of the hand at the gripping portions 20 and 22, portions which never come into contact with the patient's mouth. With the sheath grasped in one hand and the free end of the thermometer in the other, the two are separated to strip the sheath from the thermometer. The sheath is discarded; and since the patient's mouth touches neither the thermometer nor that portion of the sheath which is touched in removing the thermometer from the patient's mouth, the spread of germs to the thermometer and to the physician's fingers is prevented.

While two embodiments of the invention have been illustrated in the various figures, it is clear that other modifications may be made without departing from the spirit and scope of the invention which is to be limited only by the appended claims.

The invention is hereby claimed as follows:

1. A bell-shaped thermometer sheath of flexible, slippery material comprising a mouth portion and a boot portion, said mouth portion having first and second lips, said first lip extending longitudinally upwardly beyond said second lip to define a backstop for use in catching a leading tip of a thermometer to help guide the thermometer into said sheath, said boot portion having an open end connected to said mouth portion and having a closed opposite end to isolate the thermometer from its environment.

2. A bell-shaped thermometer sheath of flexible, slippery material comprising a mouth portion and a boot portion, said mouth portion having oppositely inclined first and second lips, said first lip extending longitudinally upwardly beyond said second lip on one side of the longitudinal axis of the sheath and said second lip extending longitudinally upwardly beyond said first lip on the opposite side of said axis to define laterally spaced backstops for use in catching a leading tip of a thermometer to help guide the thermometer into said sheath, said boot portion having an open end connected to said mouth portion and having a closed opposite end to isolate the thermometer from its environment.

3. A bell-shaped thermometer sheath of flexible, slippery material comprising a mouth portion and a boot portion, said mouth portion having parallel first and second lips disposed substantially perpendicular to the longitudinal axis of the sheath, said first lip extending longitudinally upwardly beyond said second lip to define a backstop for use in catching a leading tip of a thermometer to help guide the thermometer into said sheath, said boot portion having an open end connected to said mouth portion and having a closed opposite end to isolate the thermometer from its environment.

References Cited by the Examiner

UNITED STATES PATENTS

| | | | |
|---|---|---|---|
| 2,480,416 | 8/1949 | Modes | 206—62 |
| 2,910,174 | 10/1959 | Reid | 206—16.5 |

THERON E. CONDON, *Primary Examiner.*